Dec. 9, 1930.  E. W. BEARDSLEY ET AL  1,784,126
PROCESS OF CRACKING HYDROCARBONS
Filed June 28, 1927    2 Sheets-Sheet 2

INVENTOR
EDWIN W. BEARDSLEY
MYRON W. COLONY
BY
Sydney D. Berry
ATTORNEY

Patented Dec. 9, 1930

1,784,126

UNITED STATES PATENT OFFICE

EDWIN W. BEARDSLEY AND MYRON W. COLONY, OF TEXAS CITY, TEXAS, ASSIGNORS TO PETROLEUM CONVERSION CORPORATION, OF NEW YORK, N. Y., A CORPORATION OF DELAWARE

PROCESS OF CRACKING HYDROCARBONS

Application filed June 28, 1927. Serial No. 201,981.

Our present invention relates to a process for converting or cracking hydrocarbon compounds particularly petroleum oils into compounds of lower molecular weight. More particularly it is an improvement in the process disclosed in the United States patent to Knox 1,715,239 of May 28, 1929. In the Knox patent mentioned, cracking of the hydrocarbon is brought about by contacting therewith highly heated hydrocarbon gases and then recovering the desired products using certain types of condensing means. Advantage is there taken of the heat in such products to raise the temperature of the incoming oil. In said patent referred to it was contemplated that the products from the reaction chamber should be led directly into thermal contact with the liquid oil about to be fed to the reaction chamber.

Figure 1:
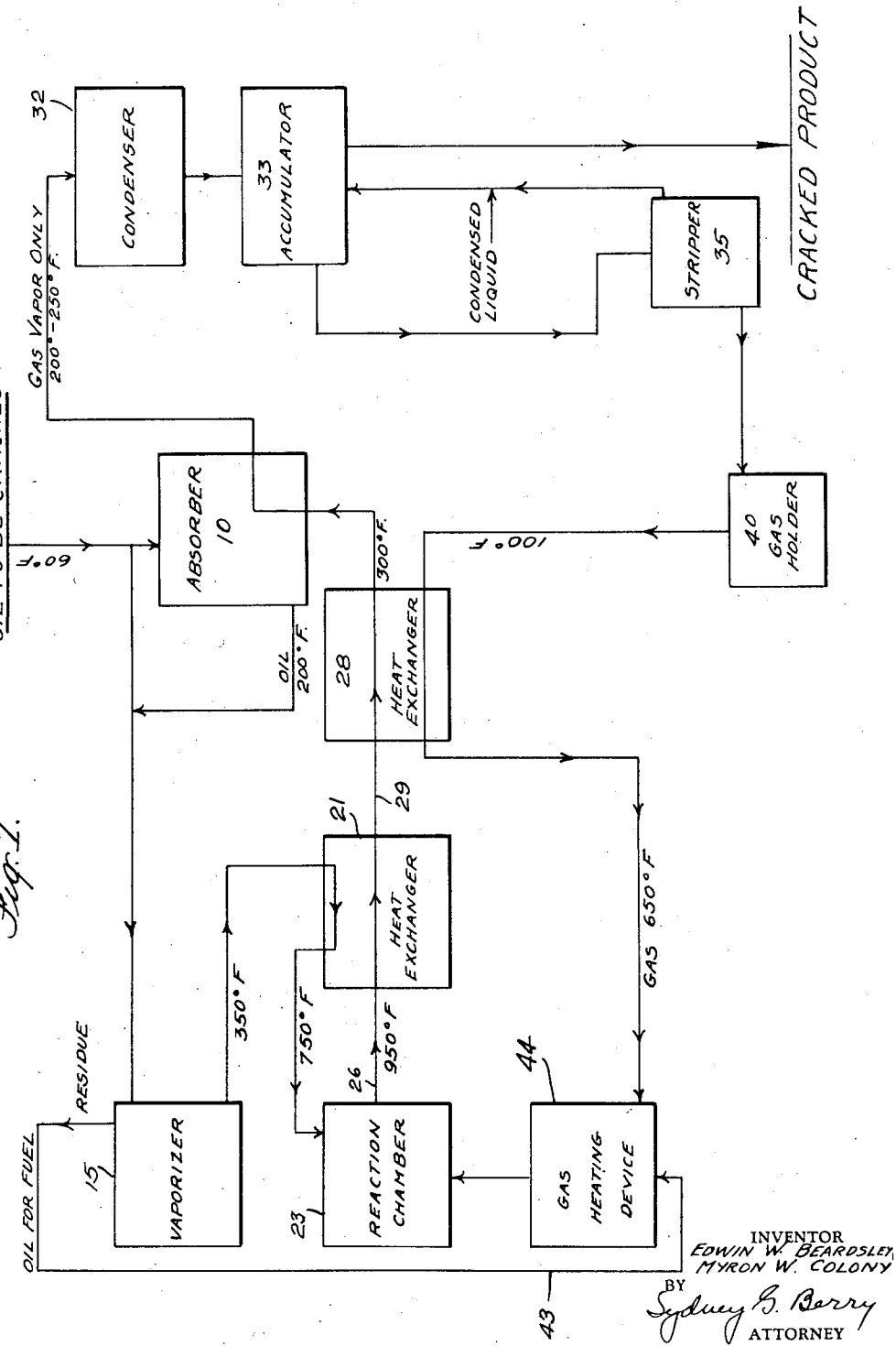
Figure 2:
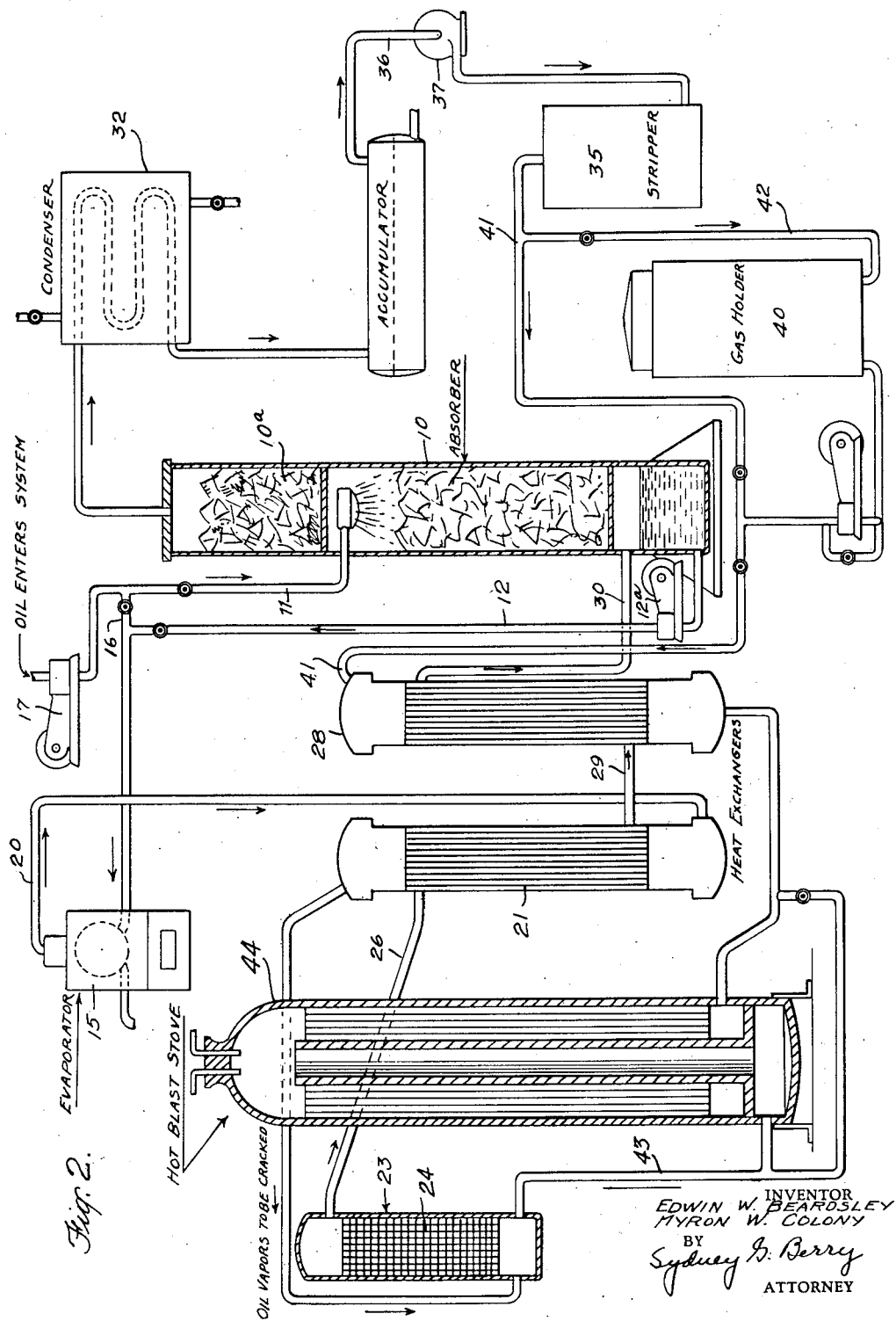

In the present invention we preferably proceed by first vaporizing the oil to be converted and then introducing the produced vapor into the reaction chamber; we have now discovered that an improved efficiency will be had by a different apportionment of the heat in the products from the reaction chamber among the various products entering the system. By way of example, we have, in the illustrative embodiment of the invention here described, used the heat in the products from the reaction chamber first, to heat the vapor to be cracked and which is fed to the reaction chamber, second, to heat the gas fed to the heating element and third, to heat the entering oil before it is fed to the vaporizer. In this manner, full advantage is taken of the heat in the reaction products to raise the temperature of products fed into the system by utilizing the available temperature gradient most suited for each product heated. Further features of the invention and objects to be attained will be apparent from the following detailed description taken with the annexed drawings in which:

Figure 1 is a diagram or so-called "flow-sheet" of a plan embodying our invention, and Figure 2 illustrates said plant in greater detail.

Referring now to Figure 2 petroleum oil, or other hydrocarbons to be cracked, enters the system by being introduced into an absorption chamber 10 through a pipe 11. In absorption chamber 10 the entering oil is preferably used as an absorption menstruum in order to pick up certain of the heavier vapors as well as to yield from itself such lighter vapors as it contains which need not be cracked. Having thus been heated in absorption chamber 10 (which it will be noted has also the function of a rectifying column) it is propelled through a pipe 12 aided by pump 12a to an evaporator 15. In evaporator 15 the oil is subjected to such heating action as will vaporize the largest quantity of it under a pressure slightly greater than that prevailing in the system, care being taken that substantially no cracking results at this stage. Steam or hydrocarbon gas or both may be used as an aid to this evaporation. A by-pass 16 from a pump 17 is also provided whereby the oil may be pumped directly into the evaporator from the bulk supply not shown.

Vapor leaves the evaporator 15 through a pipe 20 through which it is conducted to a heat exchanger 21 which may be of the tubular or other suitable type. After having its temperature raised in exchanger 21 the oil vapor is conducted to a reaction chamber 23 which may be provided with checkerwork 24 to insure mixing of the vapors and gases. Herein the vapor is heated to the desired cracking temperature by means of highly heated gases, which preferably are of a hydrocarbon nature, mixed with a desired proportion of steam, although the present invention is not concerned with the specific composition of the gases used. In the embodiment of the process at present preferred by us we make use of the residual gases (and uncondensible vapors if any) in the system to constitute the heat carrier, passing these through a hot blast stove presently to be described. During their passage through the stove, the gases are highly heated and are converted largely into hydrogen and methane. As mentioned, we also find it advantageous to use liberal quantities of steam along with the heat carrying gas or gases, and if desired, we may employ steam alone.

The oil vapor having been cracked in reaction chamber 23, the products of the cracking reaction are conducted from the reaction chamber through a pipe 26 to heat exchanger 21 where the highly heated products give up a portion of their heat to the vapor from the evaporator 15 as has been previously described, it being understood that in this and the succeeding heat exchanger there is no physical mingling of the heating and heated products. From heat exchanger 21 the partially cooled reaction products pass to a second heat exchanger 28 through a pipe 29. In this exchanger 28, heat is imparted by said reaction products to the gases used as the heat carrier prior to their introduction to the main heating element or hot blast stove to be described. From heat exchanger 28 the gas and vapor products pass through a conduit 30 to the scrubber 10 where as has been previously described the gaseous products are subjected to the scrubbing action of the entering oil. Scrubber 10 has upper section 10a below intake 11 filled with suitable filtering material which prevents entrained liquid from leaving the scrubber. In the scrubber the products are further cooled, and the vapors heavier than the desired product removed. It will be understood that by regulating the amount of oil fed to the scrubber (the rest being by-passed directly to the evaporator 15) an accurate control of the temperature in scrubber 10 may be had. The vapors of the desired products together with the noncondensible vapors and the residual gases now traverse the condenser 32 and the condensed product led into the receiver 33. From there, the residual gases and uncondensed vapors pass to a scrubber or stripper 35 of usual type through pipe 36 and circulating pump 37. Stripper 35 accomplishes the useful function of removing the very light vapors which ordinarily escape condensation in the usual condenser, but which are very valuable as an ingredient in motor fuels.

The residual gases from the stripper 35 may now either be fed back into the system or led to a gas accumulator 40, pipes 41, 42 and suitable valves serving the purpose of thus conducting the gases. For conducting the gases back into the system a pipe 41 communicates with the proper compartment of the heat exchanger 28 as has been already described. From the exchanger 28 the thus heated gases pass to the heating element 42 which preferably is of the blast stove type wherein the temperature of the gases is raised to that required for cracking the oil vapor. A conduit 43 leads from the hot blast stove to the reaction chamber.

In the flow-sheet constituting Figure 1, we have indicated the approximate temperatures of the different products in the system, it being understood that such temperatures are by way of example only and may be suitably varied for different starting materials and different operating conditions. Referring to Figure 1 it will be seen that by means of the various heat interchange steps we are enabled first to increase the temperature of the entering oil from 60° F. to 200° F. in the scrubber 10, the vapor produced from said oil, from 350° F. to 750° F. by means of the heat interchanger (21) used. In the case of the gases which leave the absorber say at 100° F., they finally enter the hot blast stove at 650° F. Finally the products from the reaction chamber which leave at say 950° F. are reduced all the way to approximately 300° F. before entering the scrubber or rectifier (35). By these steps, very considerable economies are effected.

It will be understood that the apparatus shown may be widely varied, e. g., the heat interchangers 21 and 28 may be combined so that they have a common heating space and separate spaces devoted to the respective products to be heated. Furthermore the order of the heating of the oil vapor and the preliminary heating of the gases may be varied, the exchangers 21 and 28 placed in parallel instead of series, etc.

By the expression "thermally contacting" in the claims, we mean without physical mingling of the fluids involved in the heat exchange. Further, steam under the conditions of use as described herein, is to be considered a gas as this term is used in the claims.

What we claim is:

1. The process of converting hydrocarbon oils into compounds of lower molecular weight which consists in storing heat in a carrier gas, introducing the thus heated gas into a reaction chamber there to mingle with the vapor of the product to be converted, passing the products of the conversion reaction from the reaction chamber through heat exchange means, separately vaporizing the incoming hydrocarbon material and passing the produced vapor in heat exchange relation with said products of reaction in said heat exchange means and thence into the reaction chamber, passing the heat carrier gas entering the cycle into heat exchange relationship with said products in further heat exchange means, thence to a gas heating device and thence to said reaction chamber and subjecting the products of the reaction to condensing conditions.

2. The process of converting hydrocarbon oils into compounds of lower molecular weight, which consists in storing heat in a carrier gas, separately vaporizing the hydrocarbon to be converted, introducing the thus heated gas into a reaction chamber, there to mingle with the vapor product to be converted, passing the products of the conversion reaction from the reaction chamber through a heat exchange means, passing incoming hydrocarbon into heat exchange relation with said products of reaction in said heat exchange means, and thence into said reaction chamber, passing the carrier gas entering the cycle into heat exchange relationship with said products in a further heat exchange means, thence to a gas heating device, and thence to said reaction chamber, and subjecting the products of the reaction to condensing conditions.

3. In the process of converting hydrocarbon oils into compounds suitable as motor fuels, the steps which consist in storing up heat in a heat carrier gas whereby the temperature thereof is above the conversion temperature, separately vaporizing the oil to be converted, mingling the thus heated carrier gas and said vapor to bring about the conversion of the vapor, subjecting the products from the conversion step to a heat exchange operation in which heat from said products is added to the carrier gas entering the cycle and to a further heat exchange operation in which the oil destined for the conversion chamber is preheated.

4. In the process of converting hydrocarbon oils into compounds suitable as motor fuels, the steps which consist in storing up heat in a heat carrier gas whereby the temperature thereof is above the conversion temperature, separately vaporizing the oil to be converted, separating the produced vapor from the unvaporized liquid, mingling the thus heated carrier gas and said vapor under conditions such that said carrier gas furnishes the entire heat necessary to convert said vapor so mingled therewith, and then subjecting the products from the conversion step to a heat exchange operation in which heat from said products is added to the carrier gas entering the cycle.

In testimony whereof we have affixed our signatures to this specification.

EDWIN W. BEARDSLEY.
MYRON W. COLONY.